United States Patent
Mang et al.

(10) Patent No.: US 12,395,463 B2
(45) Date of Patent: *Aug. 19, 2025

(54) DISCOVERING UNUSED INTERNET PROTOCOL VERSION 4 ADDRESS BLOCKS

(71) Applicant: AT&T Intellectual Property I, L.P., Atlanta, GA (US)

(72) Inventors: Xiaowen Mang, Morganville, NJ (US); Anestis Karasaridis, Oceanport, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,335

(22) Filed: Mar. 8, 2024

(65) Prior Publication Data

US 2025/0039127 A1  Jan. 30, 2025

Related U.S. Application Data

(63) Continuation of application No. 18/296,405, filed on Apr. 6, 2023, now Pat. No. 11,962,568, which is a
(Continued)

(51) Int. Cl.
*H04L 61/5046* (2022.01)
*H04L 61/5061* (2022.01)
(Continued)

(52) U.S. Cl.
CPC ...... *H04L 61/5046* (2022.05); *H04L 61/5061* (2022.05); *H04L 2101/604* (2022.05); *H04L 2101/668* (2022.05)

(58) Field of Classification Search
CPC ..... H04W 24/02; H04W 12/12; H04W 24/04; H04L 41/084; H04L 41/0233; H04L 41/12; H04L 41/145; H04L 41/082
See application file for complete search history.

(56) References Cited

U.S. PATENT DOCUMENTS 8,862,735 B1  10/2014  Singh et al.
8,868,784 B2  10/2014  Subramanian
(Continued)

OTHER PUBLICATIONS

"Notice of Allowance for U.S. Appl. No. 17/222,491", dated Jan. 10, 2023.
(Continued)

*Primary Examiner* — Patrice L Winder
(74) *Attorney, Agent, or Firm* — Guntin & Gust, PLC; Miyoung Shin

(57) ABSTRACT

The disclosed technology is directed towards locating and counting unused nodes, such as free Internet Protocol version 4 (IPv4) address blocks. A hierarchical structure of nodes is created from an origin block to a specified lower level, and the hierarchical structure is processed using mapping and eliminating to locate free nodes. A first node group comprises node(s) in use, a second node group identifies intermediate subnets between the first node of the first node group and the specified origin block, and a third node group identifies any subnets hierarchically below node (s) in use. Unused (free) node count information is obtained based on nodes below the origin block that are not in the first node group, the second node group, or the third node group.

20 Claims, 14 Drawing Sheets

Related U.S. Application Data continuation of application No. 17/222,491, filed on Apr. 5, 2021, now Pat. No. 11,652,787.

(51) Int. Cl.
*H04L 101/604* (2022.01)
*H04L 101/668* (2022.01)

(56) References Cited

U.S. PATENT DOCUMENTS

| | | | |
|---|---|---|---|
| 2003/0053441 A1 | 3/2003 | Banerjee | |
| 2007/0237141 A1* | 10/2007 | Marchese | H04L 41/12 370/389 |
| 2009/0254833 A1* | 10/2009 | Mclaughlin | H04L 41/22 715/737 |
| 2016/0234161 A1 | 8/2016 | Banerjee et al. | |
| 2020/0314058 A1* | 10/2020 | Adamski | H04L 41/22 |
| 2022/0191168 A1 | 6/2022 | Snehashis et al. | |

OTHER PUBLICATIONS

"Office Action for U.S. Appl. No. 17/222,491", dated Jun. 24, 2022.
iana.org , "Number Resources", https://www.iana.org/numbers, Retrieved from the Internet: Jul. 2, 2021, 9 Pages.
wikipedia.org , "Billion", https://en.wikipedia.org/wiki/1,000,000,000, Retrieved from the Internet: Jul. 2, 2021, 7 Pages.
wikipedia.org , "Computer network", https://en.wikipedia.org/wiki/Computer_network, Retrieved from the Internet: Jul. 2, 2021, 24.
wikipedia.org , "Domain Name System", https://en.wikipedia.org/wiki/Computer_network, Retrieved from the Internet: Jul. 2, 2021, 19 Pages.
wikipedia.org , "Dynamic Host Configuration Protocol", https://en.wikipedia.org/wiki/Dynamic_Host_Configuration_Protocol, Retrieved from the Internet: Jul. 2, 2021, 24 Pages.
wikipedia.org , "Internet", https://en.wikipedia.org/wiki/Internet, Retrieved from the Internet: Jul. 2, 2021, 37 Pages.
wikipedia.org , "IP address", https://en.wikipedia.org/wiki/IP_address, Retrieved from the Internet: Jul. 2, 2021, 11 Pages.
wikipedia.org Org , "IP address management", https://en.wikipedhttps//en.wikipedia.org/wiki/IP_address_managementia.org/wiki/IP_address_management, Retrieved from the Internet: Jul. 2, 2021, 9 Pages.
wikipedia.org , "IPv4", https://en.wikipedia.org/wiki/IPv4#Addressing, Retrieved from the Internet: Jul. 2, 2021, 9 Pages.
wikipedia.org , "IPv4 Address Exhaustion", https://en.wikipedia.org/wiki/IPv4_address_exhaustion, Retrieved from the Internet: Jul. 2, 2021, 15 Pages.
wikipedia.org , "IPv4 Address Management", https://en.wikipedia.org/wiki/IP_address_management, Retrieved from the Internet: Jul. 2, 2021, 9 Pages.
wikipedia.org , "IPv6", https://en.wikipedia.org/wiki/IPv6, Retrieved from the Internet: Jul. 2, 2021, 18 Pages.
wikipedia.org , "IPv6 deployment", https://en.wikipedia.org/wiki/IPv6_deployment, Retrieved from the Internet: Jul. 2, 2021, 36 Pages.
wikipedia.org , "Software", https://en.wikipedia.org/wiki/Software, Retrieved from the Internet: Jul. 2, 2021, 9 Pages.

\* cited by examiner

DISCOVERING UNUSED INTERNET PROTOCOL VERSION 4 ADDRESS BLOCKS

RELATED APPLICATION

The subject patent application is a continuation of, and claims priority to, U.S. patent application Ser. No. 18/296,405, filed Apr. 6, 2023, which is a continuation of and claims priority to U.S. patent application Ser. No. 17/222,491, filed Apr. 5, 2021, now U.S. Pat. No. 11,652,787 and entitled "DISCOVERING UNUSED INTERNET PROTOCOL VERSION 4 ADDRESS BLOCKS," the entirety of which priority applications are hereby incorporated by reference herein.

TECHNICAL FIELD

The subject application relates to Internet Protocol version 4 (IPv4) address blocks, and related embodiments.

BACKGROUND

Internet Protocol version 4 (IPv4) addressing is a widely used protocol used to assign addresses to devices on a network. IPv4 addresses are 32-bit values, corresponding to approximately 4.3 billion possible addresses, and thus are becoming depleted as Internet usage continues to expand. A more recent protocol is IPV6, which coexists with IPv4 on the Internet, and which was developed in part because of the depletion of IPV4 addresses. Notwithstanding the eventual superseding of IPV4 with IPV6, IPv4 addressing will remain in use for a relatively long time.

The shortage of available IPv4 addresses has made them a valuable asset, and indeed are traded and sold. Thus, efficiently managing and/or monetizing unused IPv4 addresses is beneficial to enterprises that own them.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
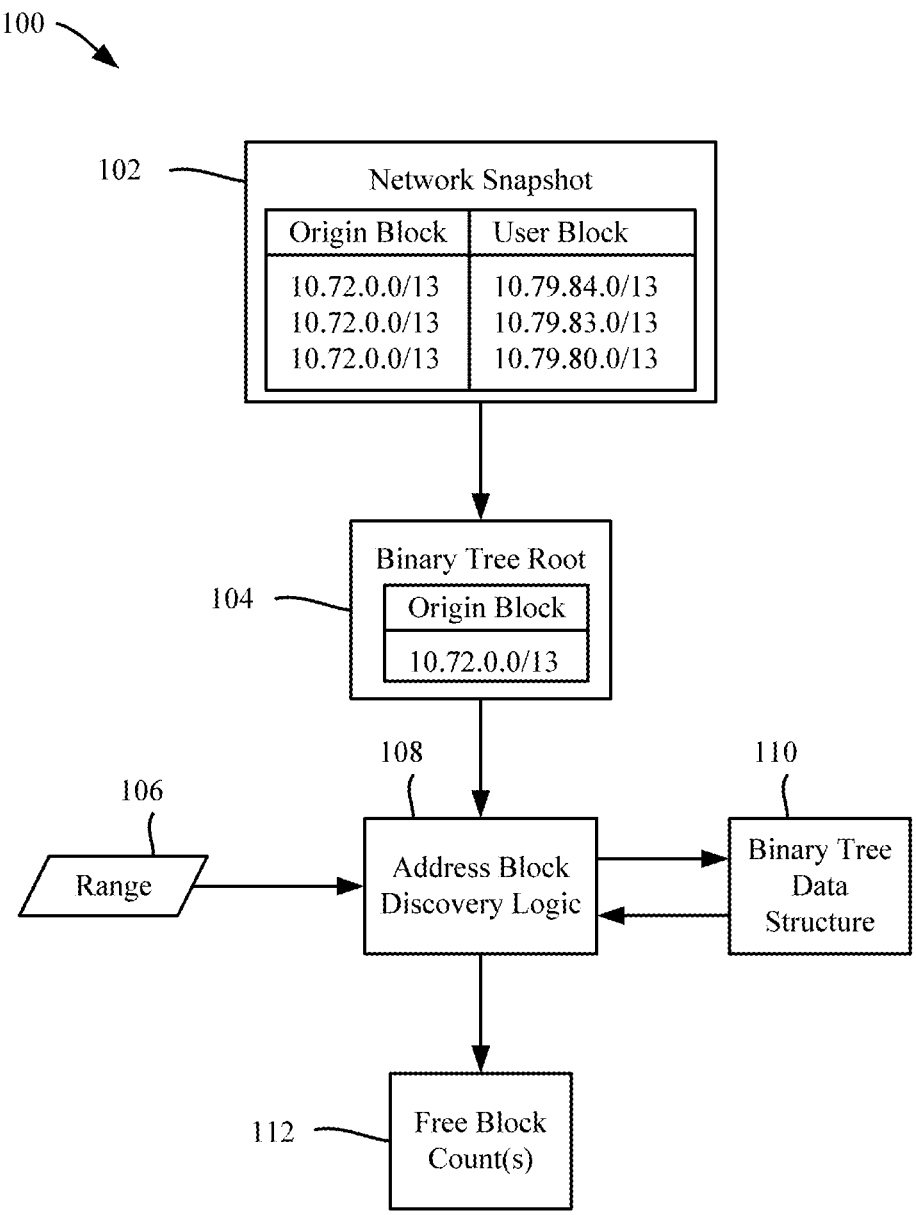
FIG. 1 is a block diagrams illustrating an example system that can locate and determine counts of unused nodes in a binary tree data structure, such as IPv4 address blocks, in accordance with various aspects and embodiments of the subject disclosure.

The technology described herein is generally directed towards an IPV4 address discovery technology that efficiently identifies, summarizes and reports unused IPv4 subnets (sub-blocks) that are hierarchically beneath pre-assigned IPv4 supernets (superblocks). To this end, the technology described herein takes IPv4's binary hierarchical structure nature into considerations and effectively discovers counts of the available free subnets that are otherwise hidden in a production system and arduous to locate.

Note that an internet service provider's IPv4 address blocks (assigned by the Internet Registry) can be referred to as origin blocks, which can be divided into smaller blocks used for a variety of services and infrastructures. Because of the binary, hierarchical nature of an IPv4 structure, the larger IPv4 address blocks are the supernets relative to the smaller IPV4 address subnets hierarchically below the referred supernets. A supernet has an IPV4 address prefix range that encompasses the IP address ranges of the subnets; (e.g., using classless inter-domain routing notation, a supernet with a prefix of "/13" has a subnet with a prefix of "/14" and so on).

As will be understood, the technology operates to locate available free subnets for any specified prefix range below a supernet level, e.g., from "/14" to "/19" and provide a count of available free subnets at each prefix level for any specified prefix range, e.g., from "/14" to "/19"; (as is understood, the upper prefix level in the range can correspond to the root level; e.g., "/14" is one level below the root level of "/13", and need not be explicitly specified in some implementations). The technology also facilitates a different way to count available free subnets of the highest prefix level, namely a count without cross-prefix level over-counting.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

As shown in the example system 100 of FIG. 1, a network snapshot 102 is obtained, such as in the form of a list of an internet service provider's address blocks in use (user blocks) under an origin block. In the example of FIG. 1, the origin block is thus the root 104 of the binary tree that includes the subnets below the origin block. As will be understood, the origin block is one suitable root, however the technology can locate blocks below any specified starting level, e.g., a supernet below an internet service provider's origin block. In in the example of FIG. 1, the root of the binary tree corresponds to the prefix level "/13".

Figure 2:
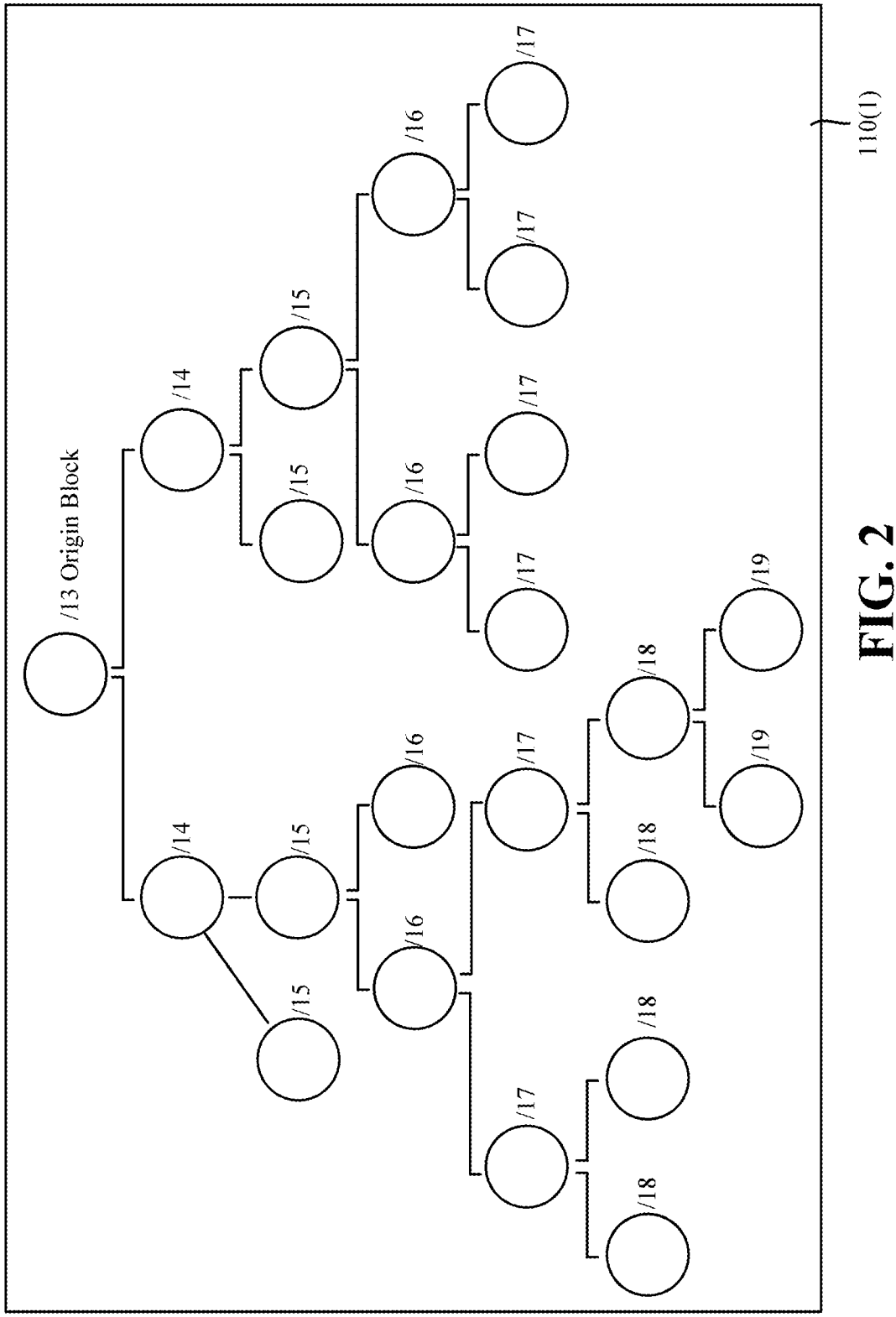
FIGS. 2-8 are example representations of a binary tree data structure in various states as nodes are eliminated based on which nodes are in use, in accordance with various aspects and embodiments of the subject disclosure.
Figure 3:
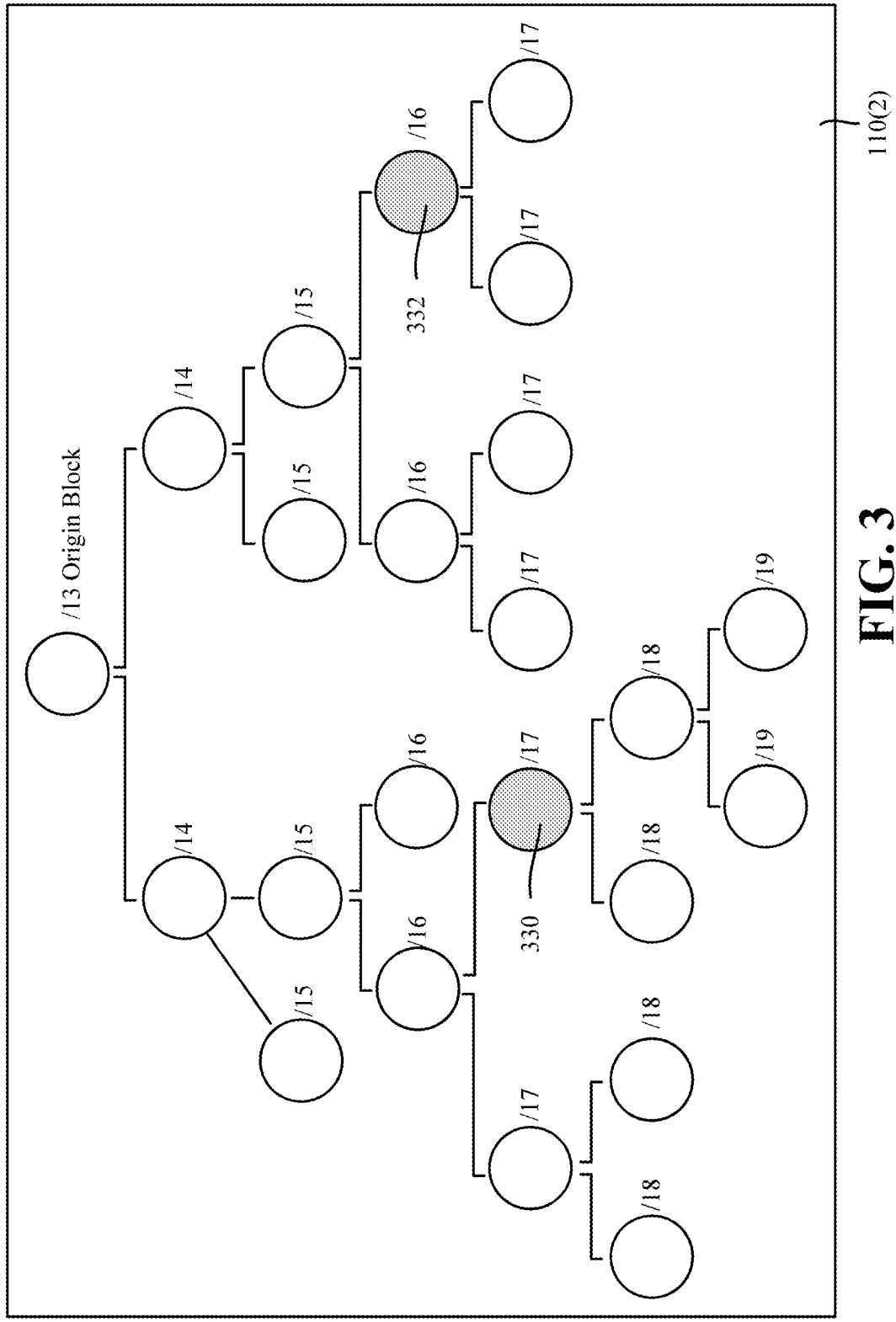
Figure 4:
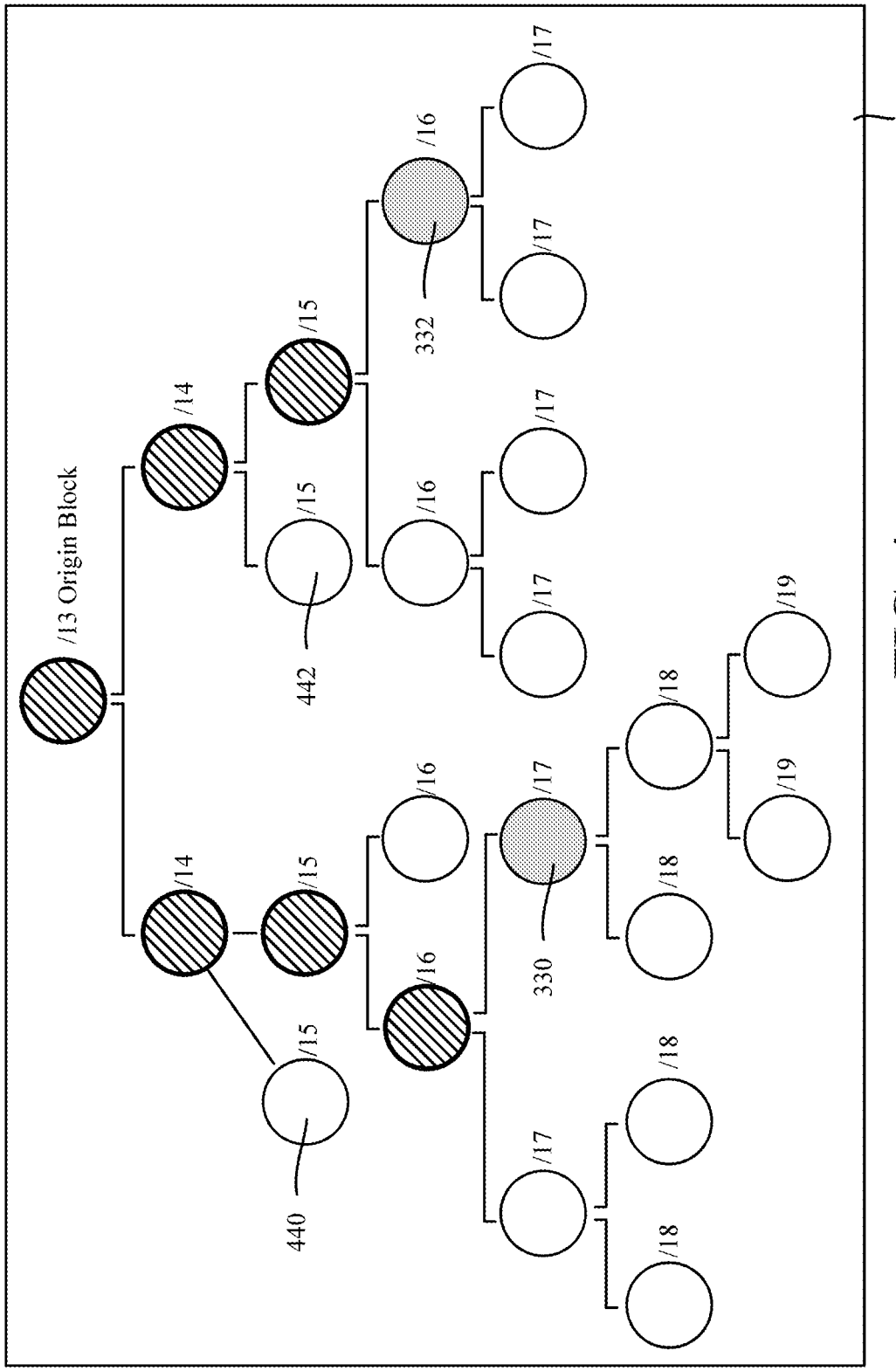
Figure 5:
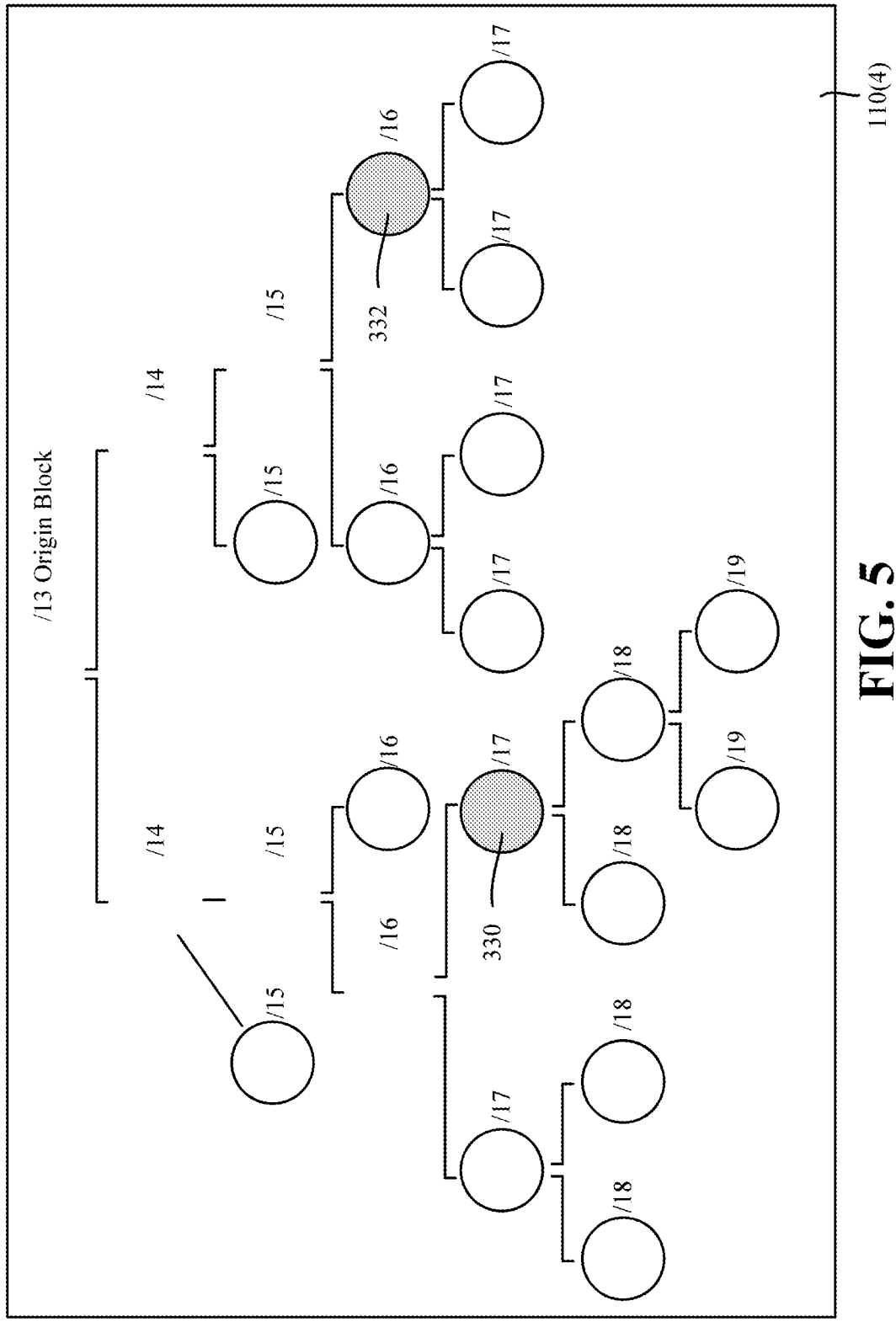
Figure 6:
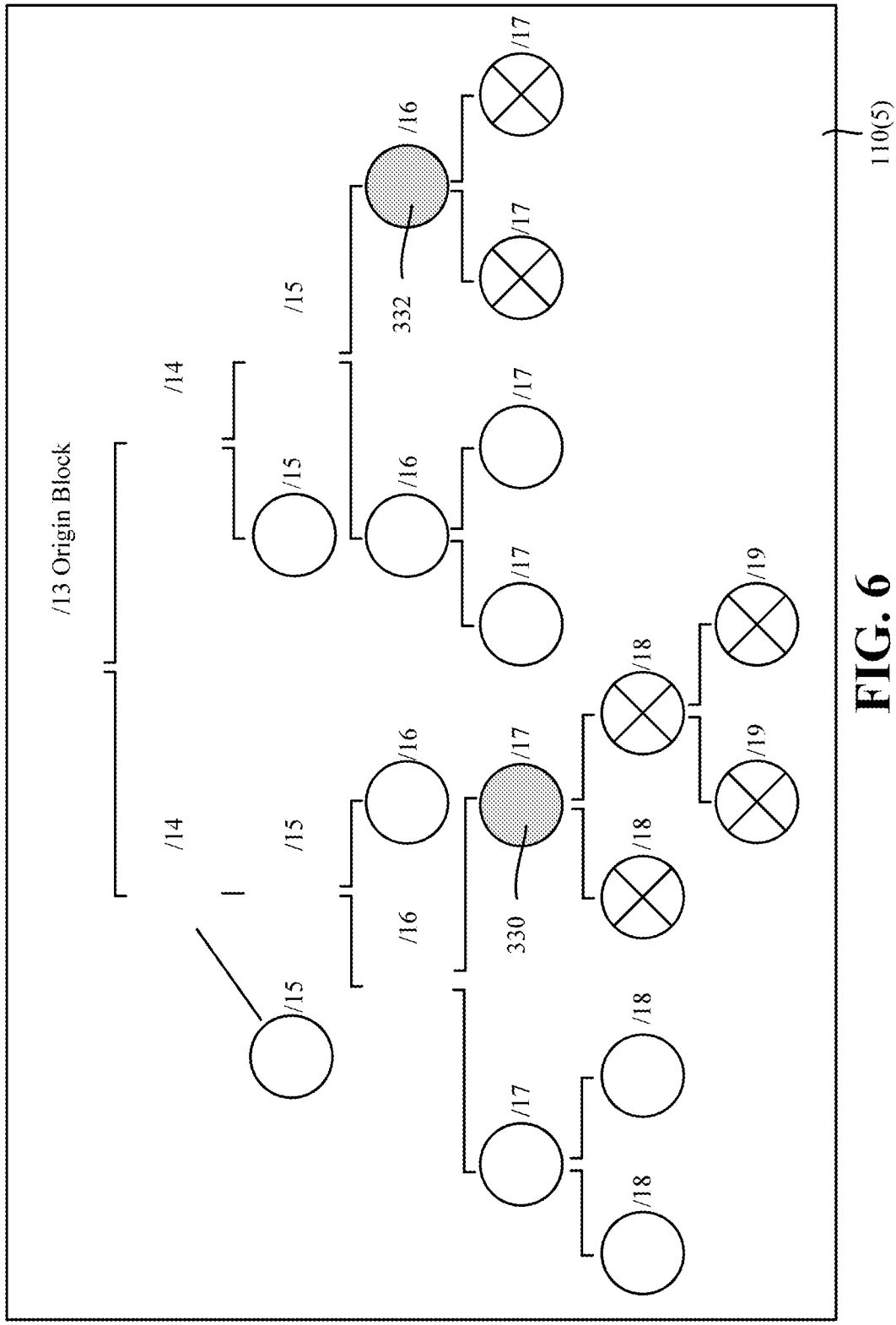

As described herein, given a specified range 106 of prefixes to process, address block discovery logic 108 generates a binary tree data structure 110. A user or automated process can specify the range. The address block discovery logic 108 can be incorporated into an IP address management (IPAM) tool, or can be a standalone product. For example, if the specified range 106 is from "/14" to "/19", such as shown in FIG. 2, then the tree root is "/13" and the lowest level in the binary tree is "/19". The address block discovery logic 108 processes this binary tree data structure 110 as described herein in order to obtain counts 112 of the free blocks at each prefix level in the specified range 106. Note that as set forth herein, there are two ways to count the free blocks.

Figure 7:
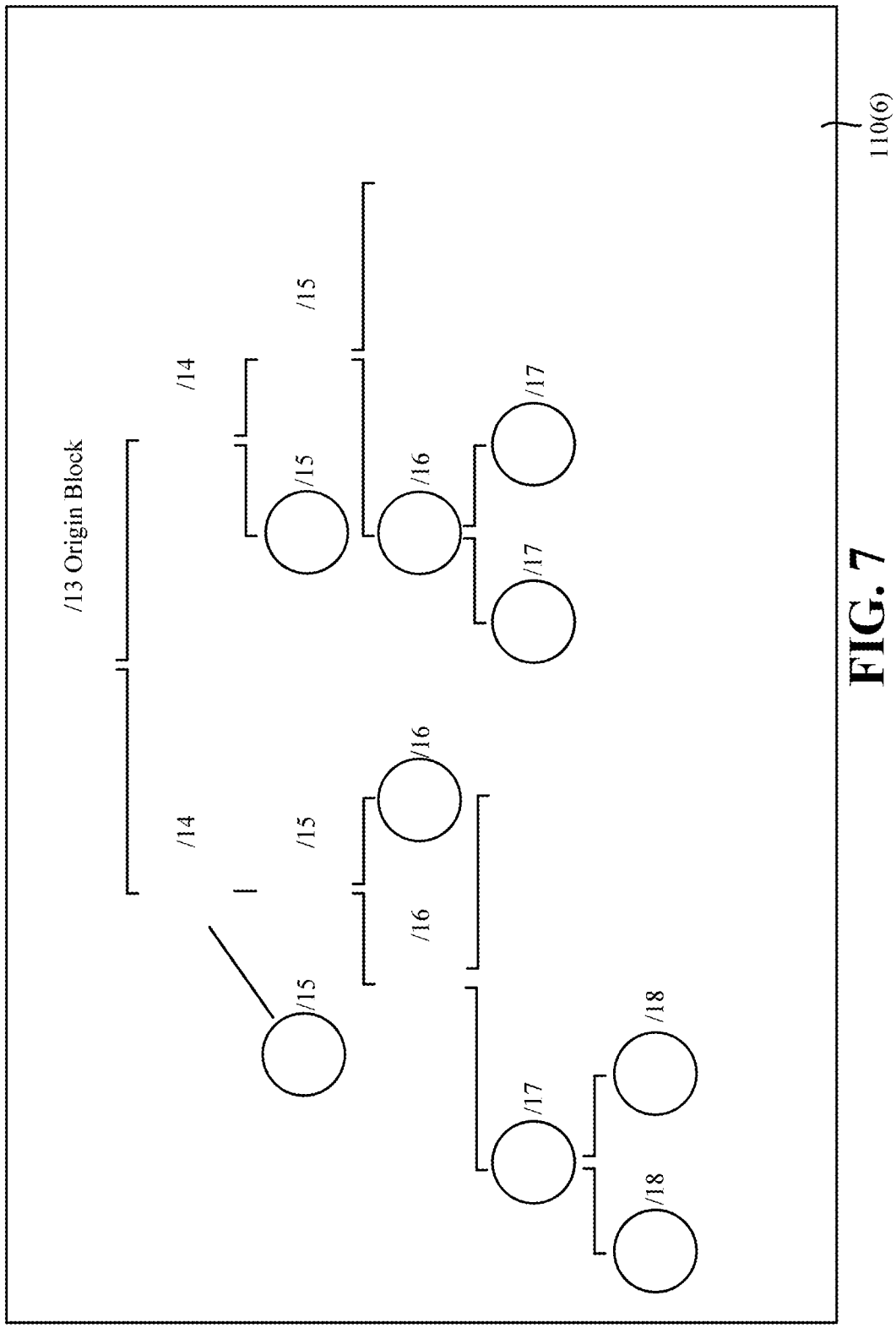
Figure 8:
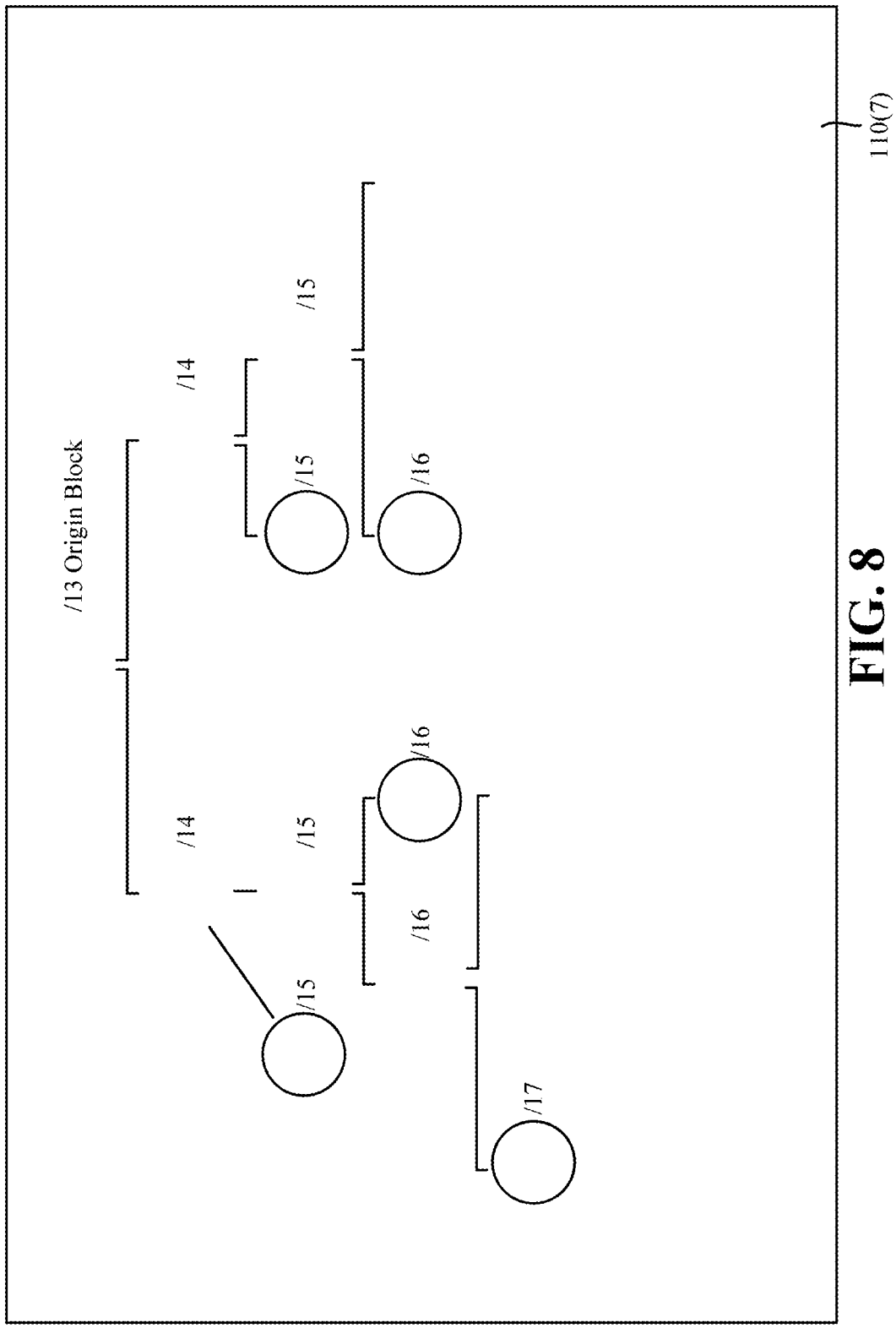
Figure 9:
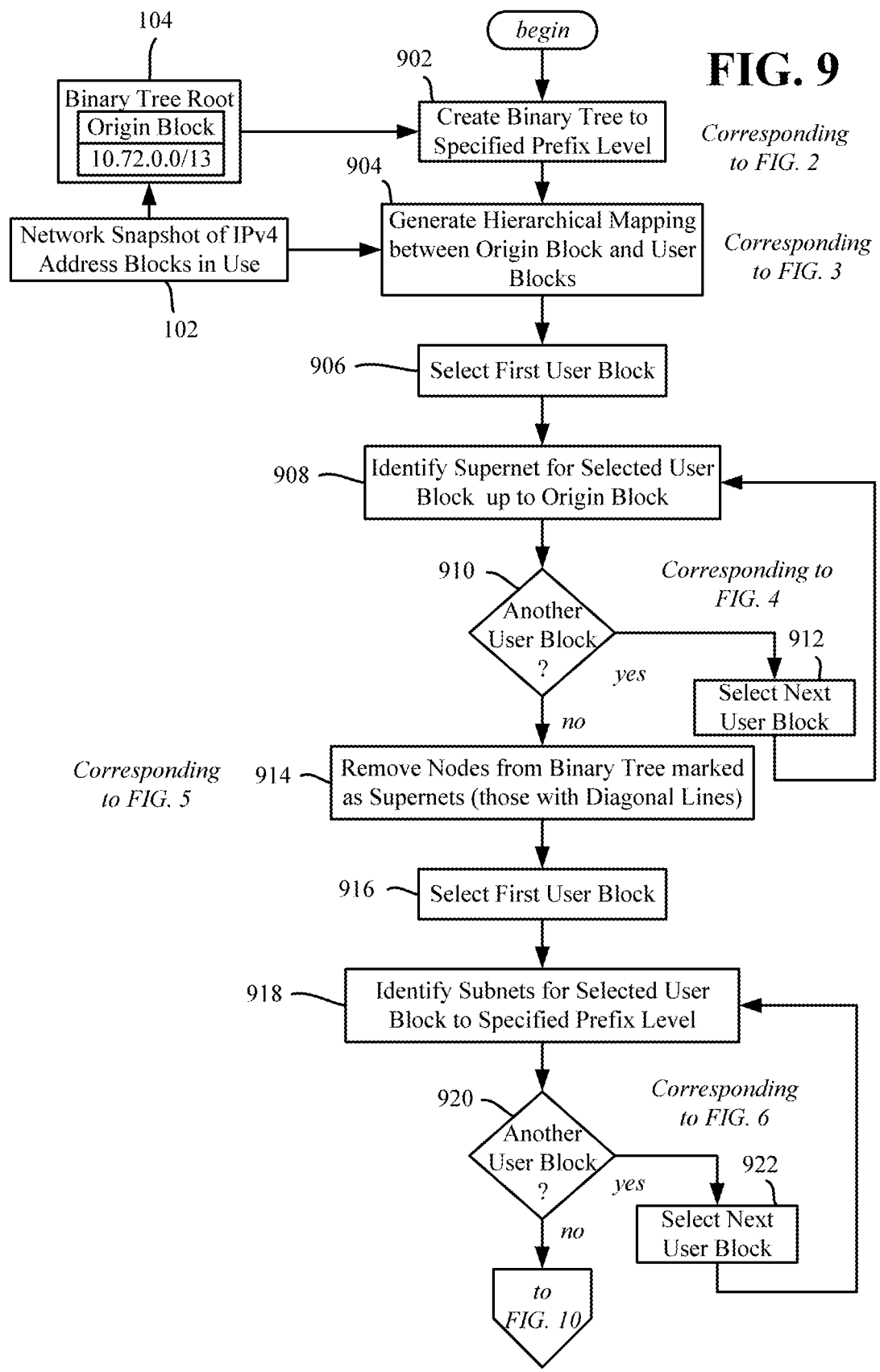
FIGS. 9 and 10 are flow diagrams representing example operations for locating and counting unused IPv4 address blocks, in accordance with various aspects and embodiments of the subject disclosure.
Figure 10:
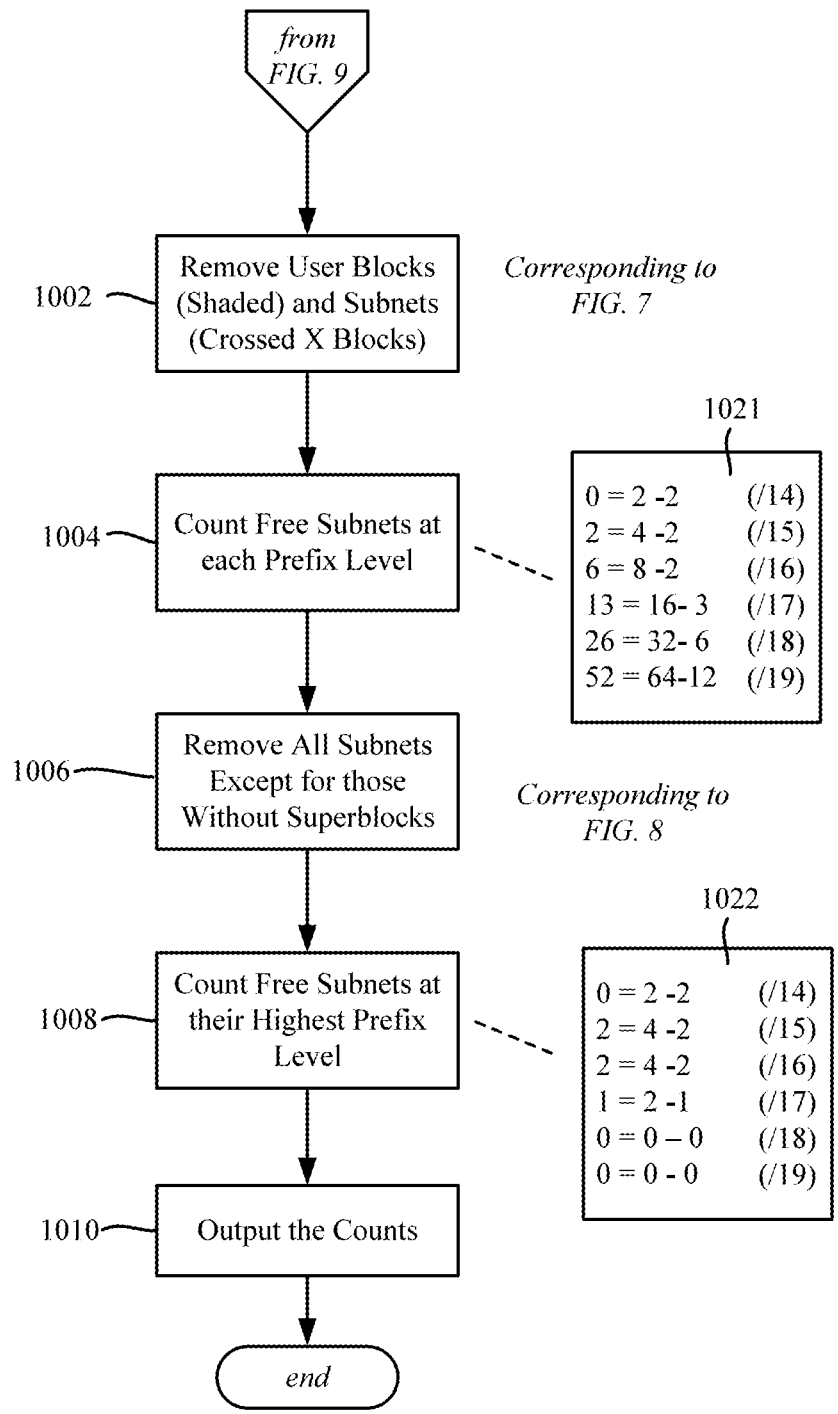

The tree data structures shown in FIGS. 2-8, along with the logic described in the flow diagrams of FIGS. 9 and 10 explain a suitable process as described herein for efficiently obtaining the count or counts 112. As can be seen, an IPV4 address structure corresponds to a binary tree, in which for each block, there are two subnets, e.g., for a given prefix level "/13" block, there are two subnets of "/14"; for each prefix level "/14" block, there are two subnets of prefix level "/15" and so on. Note that for purposes of space limitations, only partial tree data structures are shown in FIGS. 2-8.

FIG. 2 represents the binary tree data structure 110 of FIG. 1 in an initial state 110(1) as described herein, that is from the root ("/13") level to the lowest specified level in the range ("/19" in this example). The creation of this binary tree data structure 110(1) is represented by operation 902 of FIG. 9, and is based on the origin block 104 and the network snapshot 102 of the IPV4 address blocks in use, referred to in FIGS. 9 and 10 as user blocks, (such as dedicated internet service blocks).

Operation 904 generates a hierarchical mapping between the origin block and the user blocks. The user blocks 330 and 332 in the binary tree data structure in this state 110(2) are shown as shaded blocks (represented as circles/tree nodes) in FIG. 3, one at prefix level "/16" and one at prefix level "/17".

Operations 906, 908, 910 and 912 identify the supernet, up to the origin block, for each user block 330 and 332. To this end, the logic 108 (FIG. 1) creates a mapping that fills the intermedium subnets between the supernets and their known subnets, which identifies where those user blocks are located at intermedium subnet prefix levels, e.g., "/16", "/15", and "/14". The supernets/mapping is shown in the binary tree data structure (state 110(3)) in FIG. 4 as the blocks with diagonal lines. Note that the blocks represented with diagonal lines may have some free subnet(s). For example, two prefix level "/15" blocks under a "/14" prefix level are free, as represented by the solid white blocks (circles/nodes) 440 and 442.

Operation 914 then removes these supernets. This is shown in the binary tree data structure at state 110(4) in FIG. 5.

Operations 916, 918, 920 and 922 identify the subnets for each user block 330 and 332 to the lowest specified prefix level ("/19" in this example). The subnets are shown in the binary tree data structure (state 110(5)) in FIG. 6 as the blocks with crossed "X's." In this example, there are two at level "/17", two at level "/18" and so on; (again note that the entire tree is not depicted).

The process continues to operation 1002 of FIG. 10, which removes the user blocks (shaded) and their subnets (crossed). This is shown in FIG. 7 as binary tree data structure state 110(6). At this time, a first type of counting can be performed. More particularly, operation 1004 counts the free subnets at each prefix level, as shown in the data structure 1021 of FIG. 10.

Due to the binary hierarchical structure of IPV4 addresses, if a remaining block (e.g., of prefix level "/17") is selected to be used, the subnets of that particular "/17" block need to be remarked or removed from the available subnet pool. Thus, a second count can be performed to maintain only the free subnets at their highest prefix level, that is, by removing cross level overlapping counts, which can be a more efficient and reliable count.

To this end, operation 1006 removes the subnets, except for those without supernets. This is shown in FIG. 8 as state 110(7). Operation 1008 represents counting the free subnets at their highest prefix level, resulting in the counts shown in the data structure 1022.

Operation 1010 outputs the counts, e.g., to a display screen, a file, a printout and/or the like. As can be readily appreciated, a user may elect to only output the first count, in which event operations 1006 and 1008 can be bypassed, or can elect to only output the second count, in which event operation 1004 can be bypassed.

To summarize, the technology described herein locates available free subnets for any specified prefix range, e.g., from "/14" to "/19", can count available free subnets at each prefix level for any specified prefix range, e.g., from "/14" to "/19" and can count available free subnets of the highest prefix level without cross prefix level over-counting. The technology described herein can answer questions such as which largest unused IPv4 subnets are available under which supernets, or for a given IPv4 address prefix range such as from "/14" to "/19", which subnets are free of use.

Figure 11:
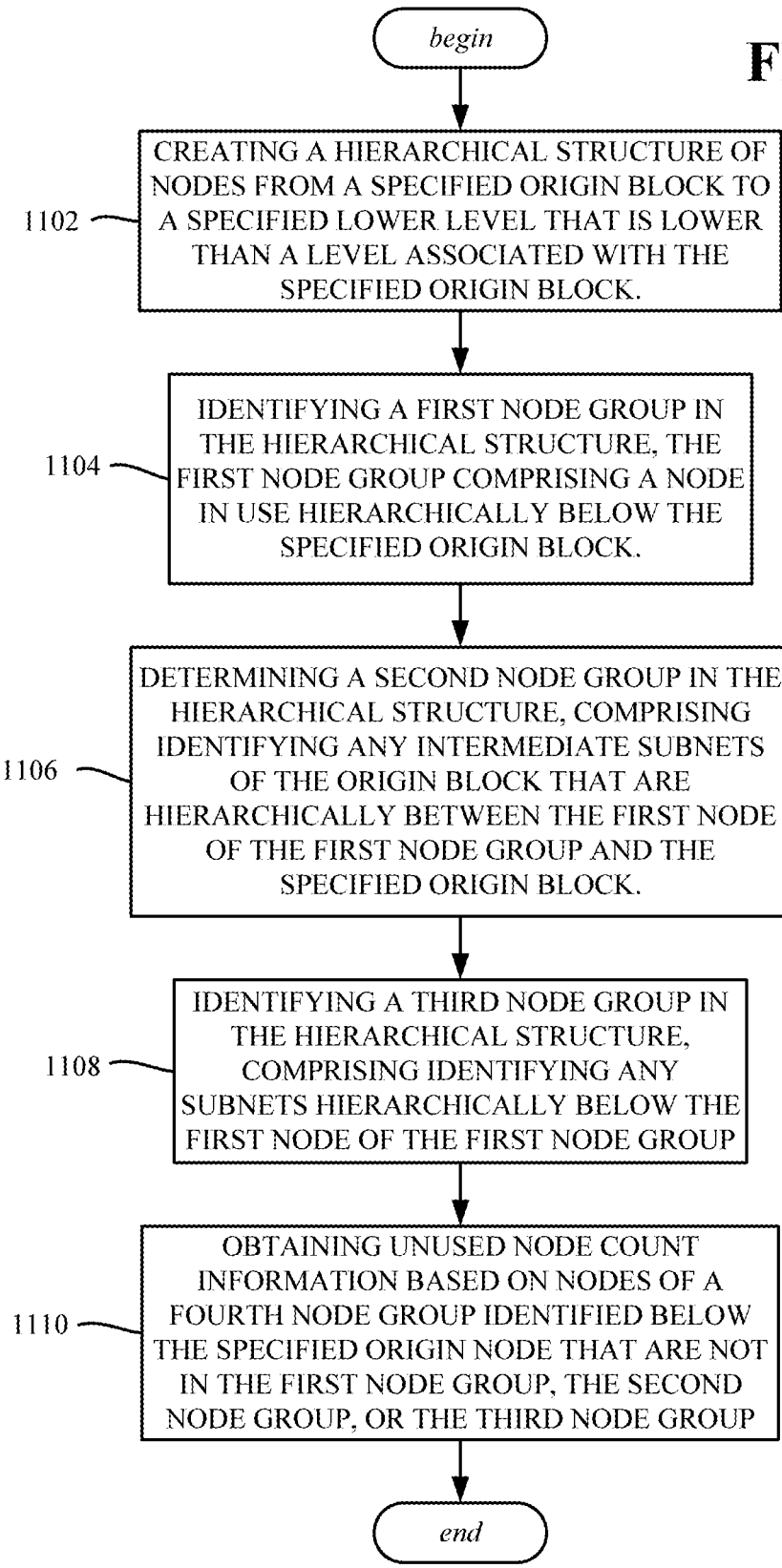
FIG. 11 illustrates example operations related to finding node groups below an origin block based on a node in use, in accordance with various aspects and embodiments of the subject disclosure.

One or more aspects are represented in FIG. 11, and can comprise example operations, such as of a processor and a memory that stores executable instructions or components, that, when executed by the processor, facilitate performance of the example operations. Operation 1102 represents creating a hierarchical structure of nodes from a specified origin block to a specified lower level that is lower than a level associated with the specified origin block. Operation 1104 represents identifying a first node group in the hierarchical structure, the first node group comprising a node in use hierarchically below the specified origin block. Operation 1106 represents determining a second node group in the hierarchical structure, comprising identifying any intermediate subnets of the origin block that are hierarchically between the first node of the first node group and the specified origin block. Operation 1108 represents identifying a third node group in the hierarchical structure, comprising identifying any subnets hierarchically below the first node of the first node group. Operation 1110 represents obtaining unused node count information based on nodes of a fourth node group identified below the specified origin node that are not in the first node group, the second node group, or the third node group.

Obtaining the unused node count information can comprise obtaining, for respective hierarchical levels of the hierarchical structure of nodes, respective counts of any unused nodes per hierarchical level of the respective hierarchical levels.

Obtaining the unused node count information can comprise obtaining, for respective hierarchical levels of the hierarchical structure of nodes, respective counts of any unused nodes per hierarchical level of the respective hierarchical levels that are not, hierarchically, a descendant of an unused node of the unused nodes.

Obtaining the unused node count information based on the remaining nodes can comprise obtaining first unused node count information, which can comprise obtaining, for respective hierarchical levels of the hierarchical structure of nodes, respective counts of any unused nodes per hierarchical level of the respective hierarchical levels, and obtaining second unused node count information, which can comprise obtaining, for the respective hierarchical levels of the hierarchical structure of nodes, respective counts of any of the unused nodes that are not, hierarchically, a descendant of an unused node of the unused nodes.

Identifying the first node group can comprise obtaining a snapshot of current network data that identifies the node in use.

Further operations can comprise receiving specified prefix range data comprising a first specified prefix corresponding to the specified origin block and a second specified prefix corresponding to the specified lower level.

The nodes can represent Internet Protocol version 4 address blocks. Further operations can comprise receiving specified prefix range data comprising a first specified Internet Protocol version 4 prefix corresponding to the specified origin block and a second specified Internet Protocol version 4 prefix corresponding to the specified lower level.

Figure 12:
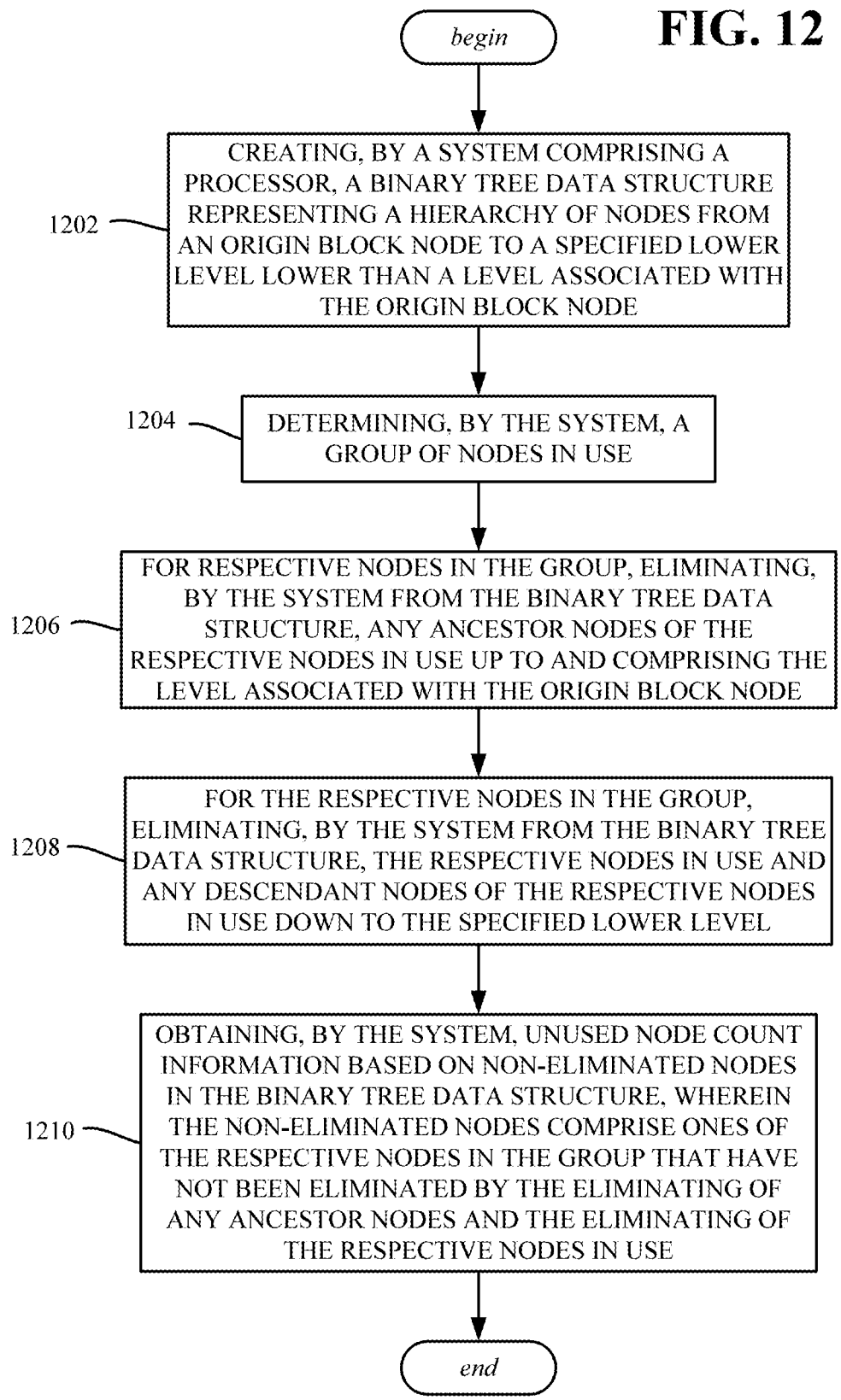
FIG. 12 illustrates example operations related to finding and eliminating node groups below an origin block based on node(s) in use to obtain counts of non-eliminated nodes, in accordance with various aspects and embodiments of the subject disclosure.

One or more aspects are represented in FIG. 12, and can comprise example operations, such as of a method. Operation 1202 represents creating, by a system comprising a processor, a binary tree data structure representing a hierarchy of nodes from an origin block node to a specified lower level lower than a level associated with the origin block node. Operation 1203 represents determining, by the system, a group of nodes in use. Operation 1206 represents, for respective nodes in the group, eliminating, by the system from the binary tree data structure, any ancestor nodes of the respective nodes in use up to and comprising the level associated with the origin block node. Operation 1208 represents, for the respective nodes in the group, eliminating, by the system from the binary tree data structure, the respective nodes in use and any descendant nodes of the respective nodes in use down to the specified lower level. Operation 1210 represents obtaining, by the system, unused node count information based on non-eliminated nodes in the binary tree data structure, wherein the non-eliminated nodes comprise ones of the respective nodes in the group that have not been eliminated by the eliminating of any ancestor nodes and the eliminating of the respective nodes in use.

Determining the respective group of nodes in use can comprise obtaining a snapshot of current network data.

Aspects can comprise receiving, by the system, specified prefix range data, which can comprise a first specified prefix corresponding to the origin node level and a second prefix corresponding to the specified lower level.

Obtaining the unused node count information based on the remaining nodes comprises determining, for respective hierarchical levels of the binary tree data structure, respective per-level counts of any unused nodes.

Obtaining the unused node count information based on the remaining nodes can comprise eliminating descendant nodes of the non-eliminated nodes, and determining, for respective hierarchical levels of the binary tree data structure, respective per-level counts of any unused nodes.

Obtaining the unused node count information based on the remaining nodes can comprise obtaining first unused node count information, which can comprise determining, for respective hierarchical levels of the binary tree data structure, respective per-level counts of any unused nodes, obtaining second unused node count information, comprising eliminating descendant nodes of the non-eliminated nodes, and determining, for the respective hierarchical levels of the binary tree data structure, respective per-level counts of any unused nodes.

The nodes can represent Internet Protocol version 4 address blocks; aspects can comprise receiving, by the system, specified prefix range data, which can comprise a first specified Internet Protocol version 4 prefix corresponding to the origin block node and a second specified Internet Protocol version 4 prefix corresponding to the specified lower level.

Figure 13:
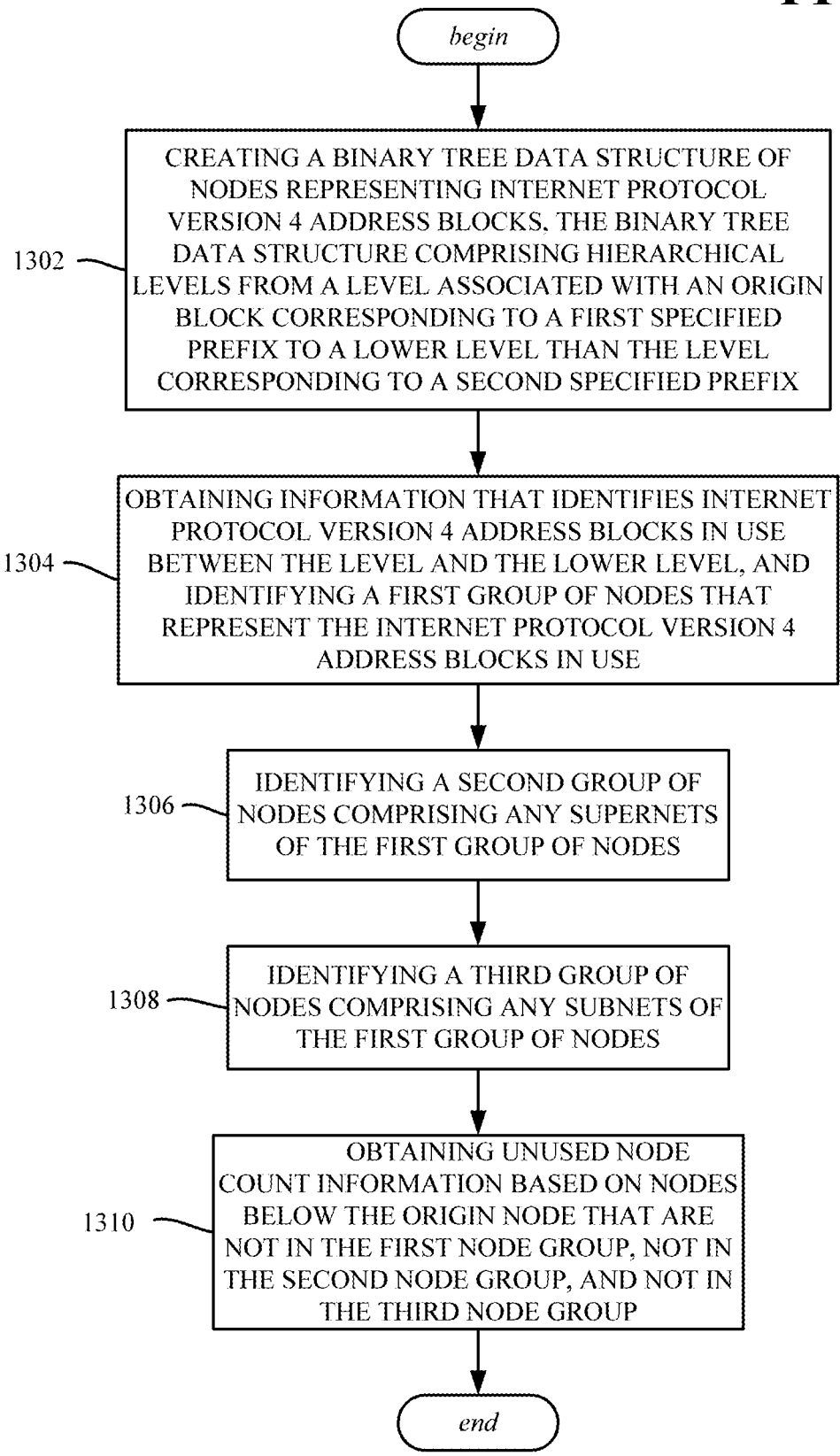
FIG. 13 illustrates example operations related to identifying unused Internet Protocol version 4 address blocks to obtain count information, in accordance with various aspects and embodiments of the subject disclosure.

One or more aspects are represented in FIG. 13, and can comprise a machine-readable medium, comprising executable instructions that, when executed by a processor, facilitate performance of example operations. Operation 1302 represents creating a binary tree data structure of nodes representing Internet Protocol version 4 address blocks, the binary tree data structure comprising hierarchical levels from a level associated with an origin block corresponding to a first specified prefix to a lower level than the level corresponding to a second specified prefix. Operation 1304 represents obtaining information that identifies Internet Protocol version 4 address blocks in use between the level and the lower level, and identifying a first group of nodes that represent the Internet Protocol version 4 address blocks in use. Operation 1306 represents identifying a second group of nodes comprising any supernets of the first group of nodes. Operation 1308 represents identifying a third group of nodes comprising any subnets of the first group of nodes. Operation 1310 represents obtaining unused node count information based on nodes below the origin node that are not in the first node group, not in the second node group, and not in the third node group.

Obtaining the unused node count information can comprise obtaining, for respective hierarchical levels, respective counts of any unused nodes per level of the respective hierarchical levels.

Obtaining the unused node count information can comprise determining a fourth node group comprising descendant nodes of the unused nodes, and counting nodes below the origin node that are not in the first node group, not in the second node group, not in the third node group and not in the fourth node group.

Counting the nodes below the origin node that are not in the first node group, not in the second node group, not in the third node group and not in the fourth node group can comprise obtaining respective per-level counts of the nodes below the origin node that are not in the first node group, not in the second node group, not in the third node group and not in the fourth node group.

Further operations can comprise obtaining the first specified prefix and the second specified prefix as range data received via a user interface.

As can be seen, the technology described herein for IPV4 address discovery solution is based on mapping and eliminating procedures. The technology takes IPv4's binary hierarchical structure nature into consideration to effectively discover the available free subnets that are otherwise hidden in production system and arduous to locate. As IPv4 addresses are a valuable asset for internet service providers, it is highly advantageous to know how many free IPv4 address blocks are between a given range, e.g., between "/14" and "/19" in the examples herein.

Figure 14:
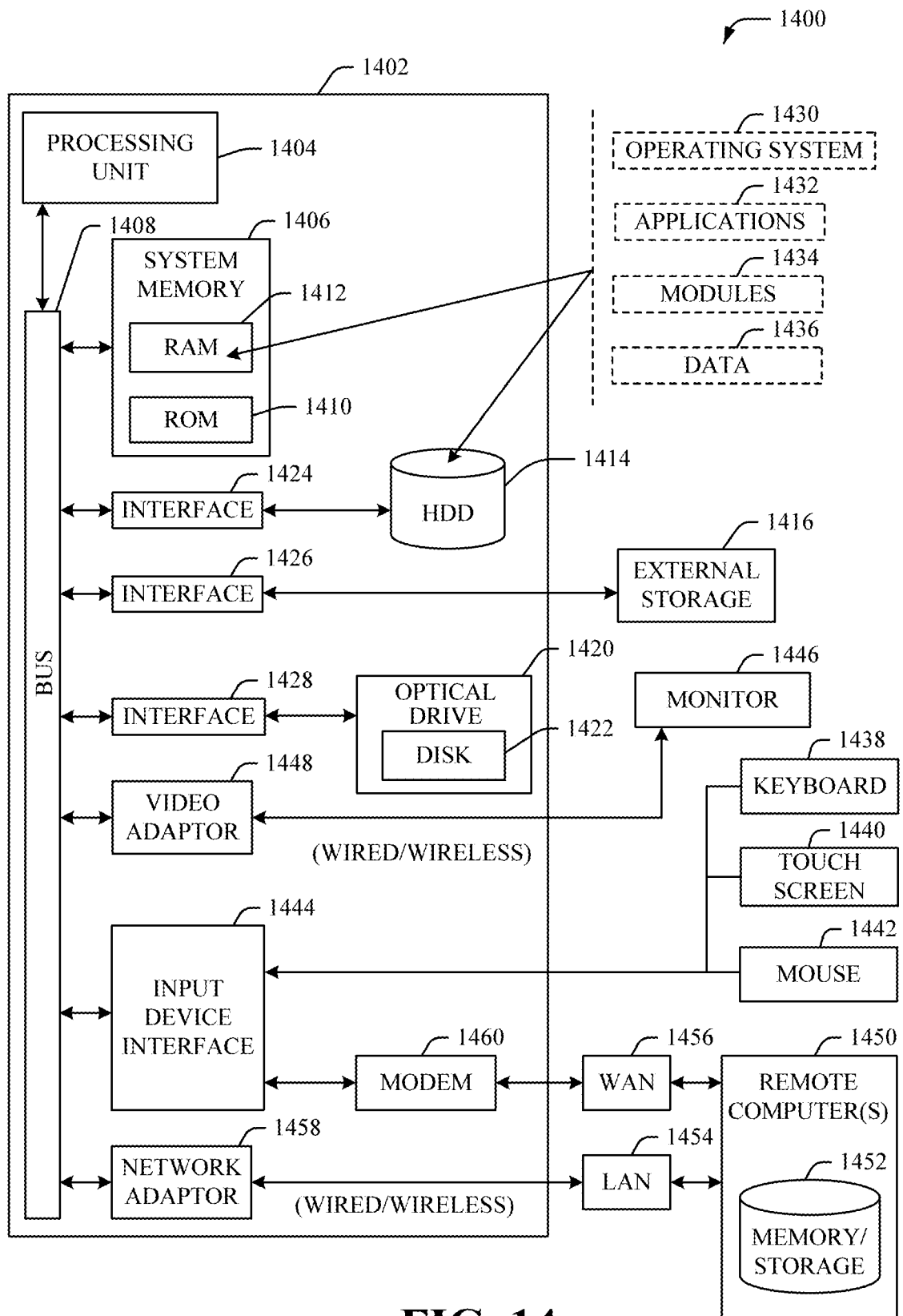
FIG. 14 illustrates an example block diagram of an example computer/machine system operable to engage in a system architecture that facilitates wireless communications according to one or more embodiments described herein.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD), non-volatile memory and other storage technology could be used in addition to, or in place of, an HDD 1414, and can be internal or external. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally include emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can include one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1294 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at a 14 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
a processor; and
a memory that stores executable instructions which, when executed by the processor of the system, facilitate performance of operations, the operations comprising:
creating internet address tree structures having a root level and a lowest subnet prefix level within a specified prefix range, wherein an original block of internet addresses corresponds to the root level, and one or more user blocks corresponds to internet addresses in use and are hierarchically positioned between the root level and the lowest subnet prefix level;
locating available free subnets in the specified prefix range by:
hierarchically mapping the origin block and the one or more user blocks;
identifying intermediate subnets of the origin block between the origin block and the one or more user blocks; and
identifying subnets below the one or more user blocks;
determining a first count of the available free subnets in the specified prefix range by eliminating the origin block, the intermediate subnets of the origin block, the subnets below the one or more user blocks, and the one or more user blocks, wherein the first count of the available free subnets comprises a count of unused internet address block of the internet address tree structures that are not assigned to any device; and
outputting the first count of the available free subnets to a user interface.

2. The system of claim 1, wherein the operations further comprise determining a second count of available free subnets by eliminating the origin block, the intermediate subnets, the subnets below the one or more user blocks, the one or more user blocks, and all subnets except for subnets without a superblock.

3. The system of claim 2, wherein the operations further comprise:
determining the available free subnets at each prefix level based on the first count of the available free subnets; and
determining the available free subnets at a highest prefix level thereof based on the second count of the available free subnets.

4. The system of claim 3, wherein the operations further comprise electing to bypass the determining of the first count of the available free subnets and outputting the second count of the available free subnets, or alternatively, electing to bypass the determining of the second count of the available free subnets and outputting the first count of the available free subnets.

5. The system of claim 1, wherein the determining the first count of the available free subnets further comprises determining unused node count information.

6. The system of claim 1, wherein the operations further comprise identifying the one or more user blocks by obtaining a snapshot of current network data that identifies a node in use, the node representing Internet Protocol version 4 address blocks.

7. The system of claim 1, wherein the operations further comprise, receiving specified prefix range data comprising a first specified Internet Protocol version 4 prefix corresponding to the origin block and a second specified Internet Protocol version 4 prefix corresponding to the lowest subnet prefix level.

8. A method comprising:
producing, by a system comprising a processor, a binary tree data structure having a root level and a lowest subnet prefix level within a specified prefix range, wherein an original block of internet addresses corresponds to the root level, and one or more user blocks corresponds to internet addresses in use and are hierarchically positioned between the root level and the lowest subnet prefix level;
counting, by the system, available free subnets in a specified prefix range by:
hierarchically mapping the origin block and the one or more user blocks, identifying ancestor blocks of the one or more user blocks; and
identifying descendant blocks below the one or more user blocks; and
eliminating the ancestor blocks, the descendant blocks, the origin block, and the one or more user blocks, wherein a count of the available free subnets comprises a count of unused internet address block of the binary tree data structure of internet addresses that are not assigned to any device; and
facilitating, by the system, presenting a user interface comprising the count of available free subnets in the specified prefix range.

9. The method of claim 8, wherein the counting the available free subnets in the specified prefix range further comprises counting the available free subnets at each prefix level.

10. The method of claim 8, wherein the counting the available free subnets further comprises:
eliminating all subnets except for subnets without a superblock, in addition to the ancestor blocks, the descendant blocks, the origin block, and the one or more user blocks; and
counting the available free subnets at a highest prefix level thereof.

11. The method of claim 8, wherein the counting the available free subnets in the specified prefix range further comprises determining unused node count information.

12. The method of claim 8, further comprising electing, by the system, to bypass the counting of the available free subnets at each prefix level and outputting the count of the available free subnets at a highest prefix level, or alternatively, electing to bypass the counting of the available free subnets at the highest prefix level and outputting the count of the available free subnets at each prefix level.

13. The method of claim 8, further comprising identifying, by the system, the one or more user blocks by obtaining a snapshot of current network data that identifies one or more nodes in use, the one or more nodes representing Internet Protocol version 4 address blocks.

14. The method of claim 1, further comprising receiving, by the system, specified prefix range data comprising a first specified Internet Protocol version 4 prefix corresponding to the origin block and a second specified Internet Protocol version 4 prefix corresponding to the lowest subnet prefix level.

15. A non-transitory machine-readable medium, comprising executable instructions that, when executed by a processor, facilitate performance of operations, the operations comprising:
  creating internet address tree structures having a root level and a lowest subnet prefix level within a specified prefix range, wherein an original block of internet addresses corresponds to the root level, and one or more user blocks corresponds to internet addresses in use and are hierarchically positioned between the root level and the lowest subnet prefix level;
  locating available free subnets in the specified prefix range by:
    hierarchically mapping the origin block and the one or more user blocks;
    identifying intermediate subnets of the origin block between the origin block and the one or more user blocks;
    identifying subnets below the one or more user blocks; and
    determining a first count of the available free subnets in the specified prefix range by eliminating the origin block, the intermediate subnets of the origin block, the subnets below the one or more user blocks, and the one or more user blocks, wherein the first count of the available free subnets comprises a count of unused internet address block of the internet address tree structures that are not assigned to any device; and
  outputting the first count of the available free subnets to a user interface.

16. The non-transitory machine-readable medium of claim 15, wherein the operations further comprise determining a second count of available free subnets in the specified prefix range by eliminating all subnets except for subnets without superblock, in addition to the origin block, the intermediate subnets of the origin block, the subnets below the one or more user blocks, and the one or more user blocks.

17. The non-transitory machine-readable medium of claim 16, wherein the determining the first count of the available free subnets further comprises determining the available free subnets at each prefix level, and the determining the second count of the available free subnets further comprises determining the second count of the available free subnets at a highest prefix level thereof.

18. The non-transitory machine-readable medium of claim 16, wherein the operations further comprise electing to bypass the determining the first count of the available free subnets and outputting the second count of the available free subnets, or alternatively, electing to bypass the determining the second count of the available free subnets and outputting the first count of the available free subnets.

19. The non-transitory machine-readable medium of claim 15, wherein the operations further comprise identifying the one or more user blocks by obtaining a snapshot of current network data that identifies one or more nodes in use, the one or more nodes representing Internet Protocol version 4 address blocks.

20. The non-transitory machine-readable medium of claim 15, wherein the operations further comprise, receiving specified prefix range data comprising a first specified Internet Protocol version 4 prefix corresponding to the origin block and a second specified Internet Protocol version 4 prefix corresponding to the lowest subnet prefix level.

* * * * *